United States Patent Office 3,769,377
Patented Oct. 30, 1973

3,769,377
DIALKYLPHOSPHORYLBICYCLO[η.2.0]ALKANES
Roy C. De Selms, Rochester, N.Y., assignor to Chevron Research Company, San Francisco, Calif.
No Drawing. Filed May 20, 1970, Ser. No. 39,168
Int. Cl. A01n 9/36; C07f 9/08
U.S. Cl. 260—958    5 Claims

ABSTRACT OF THE DISCLOSURE

A compound of the formula

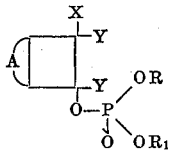

wherein A is alkylene or alkenylene of from 3 to 10 carbon atoms; R and $R_1$ are alkyl radicals of 1 to 4 carbon atoms; X and Y are chlorine or bromine substituents, or the Y's may be taken together to form a bond between the carbon atoms to which they are attached. The compounds find use as insecticides, particularly as against aphids.

BACKGROUND OF THE INVENTION

Field

The present invention is directed to bicyclic compounds, particularly dialkylphosphorylbicyclo [η.2.0] derivatives, wherein the alkyl radicals are from 1 to 4 carbon atoms and η is from 3 to 10. The dialkylphosphorylbicyclo [η.2.0] derivatives are insecticides.

DESCRIPTION OF THE INVENTION

The dialkylphosphorobicyclo [η.2.0] derivatives of the present invention may be represented by the formula

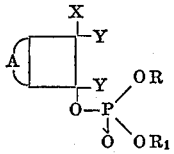

wherein A is alkylene or alkenylene of from 3 to 10 carbon atoms; wherein R and $R_1$ are low molecular weight alkyl radicals of from 1 to 4 carbon atoms and may be the same or different; wherein X is a chlorine or bromine substituent; and wherein Y is a chlorine or bromine substituent or may be taken together to form a bond between the carbon atoms to which they are attached.

Preferably A in the above formula is one of the following divalent hydrocarbon groups:

(1) —(CH$_2$)$_m$— wherein $m$ is an integer from 3–10.
(2) —(CH$_2$)$_n$—CH=CH—(CH$_2$)$_p$— wherein $n$ and $p$ are integers from 0–8, the sum of $n$ and $p$ being 1–8.

Preferably, $m$ is an integer of from 3 to 8 and $n$ and $p$ are integers from 0 to 4, the sum of $n$ and $p$ being 1 to 4. Still more preferably $m$ is an integer of from 3 to 6 and $n$ and $p$ are integers of from 1 to 4, the sum of $n$ and $p$ being 2 to 4.

Thus representative divalent radicals A are:

—CH$_2$—CH$_2$—CH$_2$—, —CH$_2$—CH$_2$—CH$_2$—CH$_2$—,

—CH$_2$—CH$_2$—CH$_2$—CH$_2$—CH$_2$—, etc., or

—CH$_2$—CH=CH—, —CH$_2$—CH=CH—CH$_2$—,

—CH$_2$—CH$_2$—CH=CH—,

—CH$_2$—CH$_2$—CH$_2$—CH=CH—CH$_2$—,

—CH$_2$—CH$_2$—CH$_2$—CH$_2$—CH=CH—,

—CH$_2$—CH$_2$—CH$_2$—CH=CH—CH$_2$—CH$_2$—CH$_2$—, etc.

R and $R_1$ in the above formula are low molecular weight alkyl radicals of from 1 to 4 carbon atoms, preferably from 1 to 2 carbon atoms. Thus R and $R_1$ may be methyl, ethyl, n-propyl, isopropyl, n-butyl or isobutyl. Preferably the R and $R_1$ radicals will be methyl or ethyl, more preferably methyl.

X and Y are chlorine or bromine substituents. Also the Y's may be taken together to form a bond between the carbon atoms to which they are attached, the resulting compounds having the formula:

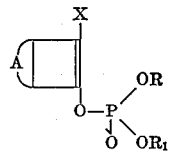

wherein A, X, R and $R_1$ are as described above.

Suitable compounds of the subject invention include 6-chloro-6,7-dibromo-7-dimethylphosphorylbicyclo[3.2.0]heptane,
6-bromo-6,7-dichloro-7-dimethylphosphorylbicyclo[3.2.0]heptane,
6,6-dibromo-7-bromo-7-dimethylphosphorylbicyclo[3.2.0]heptane,
6,6-dichloro-7-chloro-7-dimethylphosphorylbicyclo[3.2.0]heptane,
6,6-dichloro-7-bromo-7-dimethylphosphorylbicyclo[3.2.0]heptane,
6,6-dibromo-7-chloro-7-dimethylphosphorylbicyclo[3.2.0]heptane,
6-chloro-6,7-dibromo-7-dimethylphosphorylbicyclo[3.2.0]hept-2-ene,
6,6,7-trichloro-7-dimethylphosphorylbicyclo[3.2.0]hept-3-ene,
6-chloro-7-dimethylphosphorylbicyclo[3.2.0]hept-6-ene,
6-bromo-7-dimethylphosphorylbicyclo[3.2.0]hept-6-ene,
6-chloro-7-dimethylphosphorylbicyclo[3.2.0]hept-2,6-diene,
6-chloro-6,7-dibromo-7-diethylphosphorylbicyclo[3.2.0]heptane,
6-bromo-6,7-dichloro-7-diethylphosphorylbicyclo[3.2.0]heptane,
6,6,7-tribromo-7-diethylphosphorylbicyclo[3.2.0]heptane,
6,6,7-trichloro-7-diethylphosphorylbicyclo[3.2.0]heptane,
6,6-dichloro-7-bromo-7-diethylphosphorylbicyclo[3.2.0]heptane,
6,6-dibromo-7-chloro-7-diethylphosphorylbicyclo[3.2.0]heptane,
6-chloro-6,7-dibromo-7-diethylphosphorylbicyclo[3.2.0]hept-2-ene,
6,6,7-trichloro-7-diethylphosphorylbicyclo[3.2.0]hept-3-ene,
6-chloro-7-diethylphosphorylbicyclo[3.2.0]hept-6-ene,
6-bromo-7-diethylphosphorylbicyclo[3.2.0]hept-6-ene,
6-chloro-7-diethylphosphorylbicyclo[3.2.0]hept-2,6-diene,
6-chloro-6,7-dibromo-7-dipropylphosphorylbicyclo[3.2.0]heptane,
6-bromo-6,7-dichloro-7-dipropylphosphorylbicyclo[3.2.0]heptane, 6,6,7-tribromo-7-dipropylphosphorylbicyclo[3.2.0]heptane,
6,6,7-trichloro-7-dipropylphosphorylbicyclo[3.2.0]heptane,
6,6-dichloro-7-bromo-7-dipropylphosphorylbicyclo[3.2.0]heptane,
6,6-dibromo-7-chloro-7-dipropylphosphorylbicyclo[3.2.0]heptane,
6-chloro-6,7-dibromo-7-dipropylphosphorylbicyclo[3.2.0]hept-2-ene,
6,6,7-trichloro-7-dipropylphosphorylbicyclo[3.2.0]hept-3-ene,
6-chloro-7-dipropylphosphorylbicyclo[3.2.0]hept-6-ene,
6-bromo-7-dipropylphosphorylbicyclo[3.2.0]hept-6-ene,
6-chloro-7-dipropylphosphorylbicyclo[3.2.0]hept-2,6-diene,
6-chloro-6,7-dibromo-7-dibutylphosphorylbicyclo[3.2.0]heptane,
6,6,7-tribromo-7-dibutylphosphorylbicyclo[3.2.0]heptane,
6,6,7-trichloro-7-dibutylphosphorylbicyclo[3.2.0]heptane,
6,6-dichloro-7-bromo-7-dibutylphosphorylbicyclo[3.2.0]heptane,
6,6-dibromo-7-chloro-7-dibutylphosphorylbicyclo[3.2.0]heptane,
6-chloro-6,7-dibromo-7-dibutylphosphorylbicyclo[3.2.0]hept-2-ene,
6,6,7-trichloro-7-dibutylphosphorylbicyclo[3.2.0]hept-3-ene,
6-chloro-7-dibutylphosphorylbicyclo[3.2.0]hept-6-ene,
6-bromo-7-dibutylphosphorylbicyclo[3.2.0]hept-6-ene,
6-chloro-7-dibutylphosphorylbicyclo[3.2.0]hept-2,6-diene,
7-chloro-7,8-dibromo-8-dimethylphosphorylbicyclo[4.2.0]octane,
7-bromo-7,8-dichloro-8-dimethylphosphorylbicyclo[4.2.0]octane,
7,7,8-tribromo-8-dimethylphosphorylbicyclo[4.2.0]octane,
7-chloro-7,8-dibromo-8-dimethylphosphorylbicyclo[4.2.0]oct-4-ene,
7-chloro-7,8-dibromo-8-dimethylphosphorylbicyclo[4.2.0]oct-3-ene,
7-chloro-8-dimethylphosphorylbicyclo[4.2.0]oct-7-ene,
7-chloro-8-dimethylphosphorylbicyclo[4.2.0]oct-2,7-diene,
8-chloro-8,9-dibromo-9-dimethylphosphorylbicyclo[5.2.0]nonane,
8-bromo-8,9-dichloro-9-dimethylphosphorylbicyclo[5.2.0]nonane,
8,8,9-trichloro-9-diethylphosphorylbicyclo[5.2.0]nonane,
8,8,9-trichloro-9-dipropylphosphorylbicyclo[5.2.0]nonane,
9-chloro-9,10-dibromo-10-dimethylphosphorylbicyclo[6.2.0]decane,
9-bromo-9,10-dichloro-10-dimethylphosphorylbicyclo[6.2.0]decane,
9,9,10-tribromo-10-dimethylphosphorylbicyclo[6.2.0]decane,
9,9,10-trichloro-10-dimethylphosphorylbicyclo[6.2.0]decane,
9,9-dichloro-10-bromo-10-dimethylphosphorylbicyclo[6.2.0]decane,
9,9-dibromo-10-chloro-10-dimethylphosphorylbicyclo[6.2.0]decane,
9-chloro-9,10-dibromo-10-dimethylphosphorylbicyclo[6.2.0]dec-4-ene,
9,9,10-trichloro-10-dimethylphosphorylbicyclo[6.2.0]dec-5-ene,
9,9,10-dichloro-10-dimethylphosphorylbicyclo[6.2.0]dec-6-ene,
9,9,10-trichloro-10-dimethylphosphorylbicyclo[6.2.0]dec-5-ene,
9,9,10-trichloro-10-dimethylphosphorylbicyclo[6.2.0]dec-2-ene,
9-chloro-9,10-dibromo-10-dimethylphosphorylbicyclo[6.2.0]dec-3-ene,
9-chloro-9,10-dibromo-10-diethylphosphorylbicyclo[6.2.0]decane,
9-chloro-10-dimethylphosphorylbicyclo[6.2.0]dec-6,9-diene,
10-chloro-10,11-dibromo-11-dimethylphosphorylbicyclo[7.2.0]undecane,
11-chloro-11,12-dibromo-12-dimethylphosphorylbicyclo[8.2.0]dodecane,
12-chloro-12,13-dibromo-13-dimethylphosphorylbicyclo[9.2.0]tridecane, and
13-chloro-13,14-dibromo-14-dimethylphosphorylbicyclo[10.2.0]tetradecane.

The present inventive compounds will be generally prepared by the following reaction schemes:

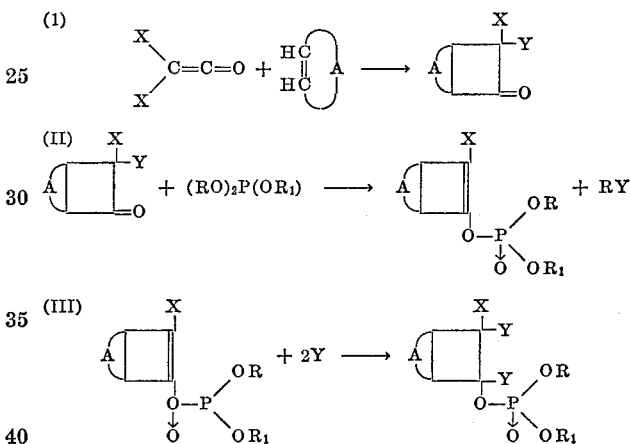

wherein the symbols A, X, Y, R and $R_1$ are as previously defined

The above reaction Step I involving dihaloketene and cycloalkene (e.g., cyclopentene, cyclopentadiene, cyclooctene, etc.) is preferably accomplished at a temperature of from about —20° C. to about 60° C. Suitable solvents may be used, such as toluene or hexane. The cycloalkene will preferably be in large excess. The dihaloketene is generally prepared by the reaction of dihaloacetyl chloride with triethylamine in equal molar amounts in the presence of a solvent such as hexane, toluene or ether. The conversion of the dihaloacetyl chloride to dihaloketene can be accomplished simultaneously with the reaction of the dihaloketene with the cycloalkene. (The Journal of the American Chemical Society, 87, 5257 (1965) discloses preparation of 7,7-dichloro-6-oxobicyclo[3.2.0]hept-2-ene by the reaction of dichloroketene with cyclopentadiene.)

The oxobicyclo product of reaction Step I will generally be recovered from the reaction mixture by distillation.

Reaction Step II is generally accomplished at a temperature of about 0° C. to about 130° C. in the presence of an inert solvent such as benzene, hexane, toluene or xylene. Generally a stoichiometric amount of trialkylphosphite or a slight excess will be used. The trialkylphosphite will preferably have identical alkyl substituents. Preferably, trimethylphosphite or triethylphosphite will be used. The product of reaction Step II may be separated by evaporation of the solvent from the reaction mixture and further purified by fractional distillation. The dialkylphosphorylbicyclo[η.2.0] derivative of reaction Step II has insecticidal activity.

If desired, the halodialkylphosphorylbicyclo[η.2.0] derivative of reaction Step II can be halogenated according to reaction Step III. The reaction Step III can be accomplished using suitable halogenation agents, for example chlorine or bromine. The reaction temperature will generally be from about 0° C. to about 75° C. and in the presence of a solvent such as chloroform or carbon tetrachloride. Generally a stoichiometric amount of chlorine or bromine or a slight excess will be used. In the case of chlorine, bubbling of a large excess of gas through the mixture may be necessary. The dialkylphosphorylbicyclo[η.2.0] derivative of reaction Step III may be recovered from the reaction mixture by removing the solvent and any excess halogen by evaporation.

EXAMPLES

The following examples describe methods which may be used to prepare the dialkylphosphorylbicyclo[η.2.0] derivatives of this invention. These examples are not intended to limit the invention described herein. Percentages are by weight unless otherwise indicated.

EXAMPLE 1

Preparation of 9,9-dichloro-10-oxobicyclo[6.2.0]decane

To a solution of 442 g. (523 ml.; 3.94 mols) of cis-cyclooctene and 58 g. (38 ml.; 0.394 mol) of dichloroacetyl chloride in 600 ml. of pure normal hexane at 0–5° C. was added gradually to a solution of 40 g. (54 ml.; 0.394 mol) of triethylamine in 200 ml. of normal hexane. The resulting mixture was allowed to stand at room temperature overnight (approximately 16 hours), filtered to remove precipitated triethylamine hydrochloride, and purified by distillation in a molecular still. The fraction distilling at 65° C. (bath temperature) at 0.02 mm. Hg weighed 42.5 g. (49 % of theoretical yield).

The product on analysis showed for chlorine: 32.05% calculated, 31.20% found.

EXAMPLE 2

Preparation of 9-chloro-10-dimethylphosphorylbicyclo[6.2.0]dec-9-ene 11.06 grams (0.05 mole) of 9,9-dichloro-10-oxobicyclo-[6.2.0 decane in 150 ml of benzene was heated to reflux and then 6.2 grams (0.05 mole) of trimethylphosphite was added dropwise. The mixture was refluxed for 8 hours and then an additional 26.4 grams of trimethylphosphite was added and the reaction continued at reflux temperature for 26 hours. The reaction mixture was stripped of low boiling material to give 11.50 grams of product analyzing as follows: Calculated (percent): P, 10.51; Cl, 12.01. Found (percent): P, 10.80, Cl, 11.85.

EXAMPLE 3

Preparation of 9-chloro-9,10-dibromo-10-dimethylphosphorylbicyclo[6.2.0]decane

To a solution of 4.50 g. (0.0153 mol) of 9-chloro-10-dimethylphosphorylbicyclo[6.2.0]dec-9-ene in 50 ml. of CCl$_4$ was added gradually during 1.5 hours a solution of 2.44 g. (0.833 ml.; 0.0153 mol) of bromine in 50 ml. of CCl$_4$. The mixture was allowed to stand overnight (approximately 16 hours) and the solven removed in subatmospheric pressure. The residual product weighed 6.30 g. (93.5% of theoretical yield).

The analysis of the product indicated: Calculated: P, 6.83%; total halogen, 6.60 meq./g. Found: P, 6.27%; total halogen, 6.9 meq./g.

Using the general procedures of Examples 1–3, other dialkylphosphorylbicyclo[η.2.0] derivatives of this invention were prepared. These compounds and analyses are tabulated in Table I.

TABLE I

| Compound | Elemental analysis, percent | | | |
|---|---|---|---|---|
| | Cl | | P | |
| | Calculated | Found | Calculated | Found |
| 7-chloro-6-dimethylphosphorylbicylco [3.2.0]hept-2,6-diene | 14.15 | 13.72 | 12.37 | 12.15 |
| 9-chloro-10-dimethylphosphorylbicyclo [6.2.0]dec-9-ene | 12.01 | 11.85 | 10.51 | 10.80 |
| 7-chloro-6-diethylphosphorylbicyclo [3.2.0]hept-2,6-diene | 12.75 | 12.14 | 11.25 | 11.21 |
| 9-chloro-10-diethylphosphorylbicyclo [6.2.0]dec-9-ene | 10.99 | 11.10 | 9.60 | 9.67 |
| 9-chloro-10-dimethylphosphorylbicyclo [6.2.0]dec-4,9-diene | 12.15 | 11.85 | 10.58 | 11.07 |

The compounds of the subject invention find use as insecticides, particularly as aphicides.

Representative dialkylphosphorylbicyclo[η.2.0] derivatives of the invention were tested as follows to illustrate the insecticidal properties. Test results are reported in Table II.

Test Procedures

Mites (*Tetranychus urticae*).—An acetone solution of the candidate toxicant containing a small amount of nonionic emulsifier was diluted with water to 100 p.p.m. Bean leaves which were infested with mites were dipped in the toxicant solution. Mortality readings were taken after 24 hours.

Houseflies (*Musca domestica*).—A 125 p.p.m. acetone solution of the candidate toxicant was placed in a syringe. A random mixture of anesthetized male and female DDT-resistant houseflies were placed on cardboard squares. A 1-microliter dose of the acetone solution was applied directly to each fly. The flies were then placed in a recovery cage. Mortality readings were taken after 24 hours.

Aphids (*Aphis gossypii* Glover).—An acetone solution of the candidate toxicant containing a small amount of nonionic emulsifier was diluted with water to 100 p.p.m. Cucumber leaves infested with the aphide were dipped in the toxicant solution. Mortality readings were taken after 24 hours.

TABLE II

| Compound | Percent mortality | | |
|---|---|---|---|
| | Mites | Flies | Aphids |
| 7-chloro-6-dimethylphosphorylbicyclo-[3.2.0]hept-2,6-diene | 98 | 100 | 100 |
| 9-chloro-10-dimethylphosphorylbicyclo-[6.2.0]dec-9-ene | | | 100 |
| 7-chloro-6-diethylphosphorylbicyclo-[3.2.0]hept-2,6-diene | 100 | [1] 85 | 100 |
| 9-chloro-9,10-dibromo-10-dimethyl-phosphorylbicyclo[6.2.0]decane | | | 100 |
| 9-chloro-10-diethylphosphorylbicyclo-[6.2.0]dec-9-ene | | | 100 |
| 9-chloro-10-dimethylphosphorylbicyclo-[6.2.0]dec-4,9-diene | | | 99 |

[1] 500 p.p.m. acetone solution of toxicant used.

In addition to the specific formulations and application techniques described above, one or more of the dialkylphosphorylbicyclo[η.2.0] derivatives of the invention may be applied in other liquid or solid formulations to the insects, their environment, or hosts susceptible to insect attack. For example, they may be sprayed or otherwise applied directly to plants or soil so as to effect control of insects coming into contact therewith.

Formulations of the compounds of this invention will comprise a toxic amount of one or more dialkylphosphorylbicyclo[η.2.0] derivatives and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, either solid or liquid carriers, will be dependent upon many factors, such as the particular bicyclic compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 50 percent by weight or higher. Economically, of course, it is desirable to use lower concentrations of this active ingredient. Thus, it is usually desirable to use less than 20 percent by weight of the active ingredient in a particular composition.

The terms "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to othe related classes of arthropods whose members are segmented invertebrates having more or fewer than six legs, such as spiders, mites, ticks, centipedes, worms and the like.

As will be evident to those skilled in the art, various modifications on this invention can be made or followed, in the light of the foregoing disclosure and discussion, without departing from the spirit or scope of the disclosure or from the scope of the following claims.

What is claimed is:

1. A compound of the formula

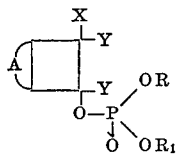

wherein A is an alkylene or alkenylene radical of from 3 to 10 carbon atoms; wherein R and $R_1$ are low molecular weight alkyl radicals of from 1 to 4 carbon atoms; wherein X is a chlorine or bromine substituent; and wherein Y is a chlorine or bromine substituent.

2. A compound of the formula

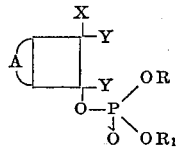

wherein A is one of the following divalent hydrocarbon groups:

(1) —$(CH_2)_m$— wherein $m$ is an integer from 3–10,
(2) —$(CH_2)_n$—CH=CH—$(CH_2)_p$— wherein $n$ and $p$ are integers from 0 to 8, the sum of $n$ and $p$ being 1–8, wherein R and $R_1$ are low molecular weight alkyl radicals of from 1 to 4 carbon atoms; wherein X is a chlorine or bromine substituent; and wherein Y is a chlorine or bromine substituent.

3. The compound of claim 2 wherein $m$ is an integer of from 3 to 8 and $n$ and $p$ are integers from 0 to 4, the sum of $n$ and $p$ being 1 to 4.

4. The compound of claim 3 wherein R and $R_1$ are methyl or ethyl.

5. The compound of claim 2 wherein $m$ is an integer of from 3 to 6.

References Cited

UNITED STATES PATENTS 2,767,206   10/1956   Whetstone et al. ____ 260—956

FOREIGN PATENTS 65,245   1/1969   Germany _____ 260—957

OTHER REFERENCES

Derwent Belgium Patents Report, No. 21/68, June 28, 1968, abstract of Belgian Patent 706,795.

ANTON H. SUTTO, Primary Examiner

U.S. Cl. X.R.

260—586 A, 956, 969, 986; 424—219